(12) United States Patent
Zelenov et al.

(10) Patent No.: US 10,628,317 B1
(45) Date of Patent: Apr. 21, 2020

(54) SYSTEM AND METHOD FOR CACHING DATA IN A VIRTUAL STORAGE ENVIRONMENT BASED ON THE CLUSTERING OF RELATED DATA BLOCKS

(71) Applicant: Parallels International GmbH, Schaffhausen (CH)

(72) Inventors: Anton Zelenov, Moscow (RU); Nikolay Dobrovolskiy, Moscow (RU); Serguei Beloussov, Costa Del Sol (SG)

(73) Assignee: PARALLELS INTERNATIONAL GMBH, Schaffhausen (CH)

( * ) Notice: Subject to any disclaimer, the term of this patent is extended or adjusted under 35 U.S.C. 154(b) by 0 days.

(21) Appl. No.: 16/129,993

(22) Filed: Sep. 13, 2018

(51) Int. Cl.
G06F 12/0868 (2016.01)
G06F 3/06 (2006.01)
G06F 16/901 (2019.01)

(52) U.S. Cl.
CPC .......... *G06F 12/0868* (2013.01); *G06F 3/061* (2013.01); *G06F 3/0665* (2013.01); *G06F 3/0683* (2013.01); *G06F 16/9024* (2019.01); *G06F 2212/152* (2013.01)

(58) Field of Classification Search
CPC .. G06F 12/0868; G06F 16/9024; G06F 3/061; G06F 3/0665; G06F 3/0683; G06F 2212/152
USPC .............................. 711/118, 3, 154; 709/217
See application file for complete search history.

(56) References Cited

U.S. PATENT DOCUMENTS

| | | | | |
|---|---|---|---|---|
| 9,268,692 B1* | 2/2016 | Wehman | ............. | G06F 12/0806 |
| 9,678,880 B1* | 6/2017 | Korotaev | ............. | G06F 16/1847 |
| 10,282,235 B1* | 5/2019 | Ozerkov | ............... | G06F 9/5077 |
| 10,496,547 B1* | 12/2019 | Naenko | ................... | G06F 3/064 |
| 2002/0078300 A1* | 6/2002 | Dharap | ............... | G06F 16/9574 711/133 |
| 2005/0081002 A1* | 4/2005 | Chang | ................... | G06F 1/3225 711/154 |
| 2014/0281211 A1* | 9/2014 | Evans | ................... | G06F 3/0647 711/111 |
| 2015/0186279 A1* | 7/2015 | Dong | .................. | G06F 12/0833 711/135 |
| 2017/0004090 A1* | 1/2017 | Karippara | ................. | G06F 9/50 |
| 2017/0013080 A1* | 1/2017 | Kosakai | .................. | H04L 67/42 |
| 2017/0168959 A1* | 6/2017 | Dodonov | ............. | G06F 12/126 |
| 2017/0310683 A1* | 10/2017 | Ashiya | ................. | H04L 63/123 |
| 2019/0095348 A1* | 3/2019 | Peng | ........................ | G06F 12/126 |
| 2019/0163509 A1* | 5/2019 | Zelenov | ............. | G06F 9/45558 |

* cited by examiner

*Primary Examiner* — Hong C Kim
(74) *Attorney, Agent, or Firm* — Lowenstein Sandler LLP (57) ABSTRACT

Systems and methods are disclosed herein for caching data in a virtual storage environment. An exemplary method comprises monitoring, by a hardware processor, operations on a virtual storage device, identifying, by a hardware processor, transitions between blocks of the virtual storage device that have the operations performed thereon, determining, by a hardware processor, a relationship between each of the blocks based on the identified transitions, clustering the blocks into groups of related blocks based on the relationship and applying, by a hardware processor, one of a plurality of different caching policies to blocks in each of the groups based on clustering.

22 Claims, 8 Drawing Sheets

SYSTEM AND METHOD FOR CACHING DATA IN A VIRTUAL STORAGE ENVIRONMENT BASED ON THE CLUSTERING OF RELATED DATA BLOCKS

FIELD OF TECHNOLOGY

The present disclosure relates generally to the field of computer virtualization, and more specifically, to systems and methods for caching data in a virtual storage environment.

BACKGROUND

With virtual machine technology, a user can create and run multiple operating environments at the same time. Each operating environment, or virtual machine, requires its own "guest" operating system (OS) and can run software applications independently from the other virtual machines. Virtual machine technology provides many benefits as it can lower information technology (IT) costs through increased efficiency, flexibility and responsiveness. Each virtual machine acts as a separate environment that reduces risks and allows developers to quickly recreate different OS configurations or compare versions of applications designed for different OSs. Additional customer uses for VMs include cloud services, targeted production server consolidation, hosting of legacy applications (older versions), and computer or server backup.

Each OS may further access one or more virtualized disks for users of the VM to store and retrieve data. This virtualized disk is a logical partitioning of an underlying physical disk of the server, or "Host". The Host may also have an OS ("Host OS") which follows a data caching policy for the host disk. However, the Host OS does not have any knowledge regarding the virtual disk file format, and thus cannot tune the caching of data accessed therein accordingly, since the virtual disk is simply viewed as an ordinary file by the Host OS. Further, blocks in a virtual disk file are stored unordered. The host OS filesystem divides this virtual disk file into blocks, and those blocks may be stored unordered on the physical disk. When a read operation is performed in the VM, the host OS reads from the beginning of the "file" associated with the virtual disk, may then skip to a middle of the file, and then return back to the beginning again, illustrating highly inefficient and mechanically expensive access of data, particularly for rotational disks.

SUMMARY

The present disclosure provides an effective solution for the foregoing problems of conventional techniques associated with virtual storage disks. Disclosed are example systems, methods and computer program products for caching data in a virtual storage environment.

In an exemplary aspect, a disclosed method comprises monitoring, by a hardware processor, operations on a virtual storage device, identifying, by a hardware processor, transitions between blocks of the virtual storage device that have the operations performed thereon, determining, by a hardware processor, a relationship between each of the blocks based on the identified transitions, clustering the blocks into groups of related blocks based on the relationship; and applying, by a hardware processor, one of a plurality of different caching policies to blocks in each of the groups based on clustering.

In another aspect, the method further comprises receiving a request for data stored on a block of the virtual storage device, determining a group in which the block has been clustered, determining a cache policy associated with the group and placing the group into cache for future access to each of the blocks within the group based on the cache policy.

In another aspect, the method further comprises determining groups of clustered blocks of the virtual storage device, defragmenting the virtual storage device, relocating blocks within each of the groups together in a physical disk underlying the virtual storage device.

In another aspect of the method, the relationship indicates blocks having the same operations performed thereon.

In another aspect of the method, the operations comprise at least a read operation, or a write operation to a block on the virtual storage device.

In another aspect of the method, identifying the transitions further comprises counting the operations on blocks and transitions from one block to another.

In another aspect of the method, clustering the blocks further comprises building a graph of the operations where nodes of the graph comprise blocks, and arc lengths of the graph indicate transition count between blocks.

In another aspect, the method further comprises performing a graph cut algorithm on the graph of operations, determining whether a cut according to the graph cut algorithm conforms to a set of criteria, the set of criteria comprising one of: leaves all segments of the graph having a number of nodes lower than a predetermined threshold value, or whether the total arc weights for the graph is greater than or equal to a predetermined threshold value, dividing the graph over the cut when the cut conforms, grouping those segments that conform to the set of criteria into a result list and re-performing the graph cut algorithm on those segments in the results list.

In another aspect of the method, the graph cut algorithm is the minimal cut algorithm.

In another aspect of the method, the predetermined threshold value is determined after a set of experiments and wherein the method further comprises determining those arcs with length less than a median arc value plus two standard deviations and removing the determined arcs from the graph.

In another aspect of the method, the transitions are changes from operating on one block in the virtual storage device to operating on another block in the virtual storage device.

In one aspect, a system is provided, the system comprising a hardware processor configured to monitor operations on a virtual storage device, identify transitions between blocks of the virtual storage device that have the operations performed thereon, determine a relationship between each of the blocks based on the identified transitions, cluster the blocks into groups of related blocks based on the relationship and apply one of a plurality of different caching policies to blocks in each of the groups based on clustering.

According to another exemplary aspect, a computer-readable medium is provided comprising instructions for performing any of the methods disclosed herein.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Exemplary aspects are described herein in the context of a system, method, and computer program product for caching data in a virtual storage environment. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

Figure 1:
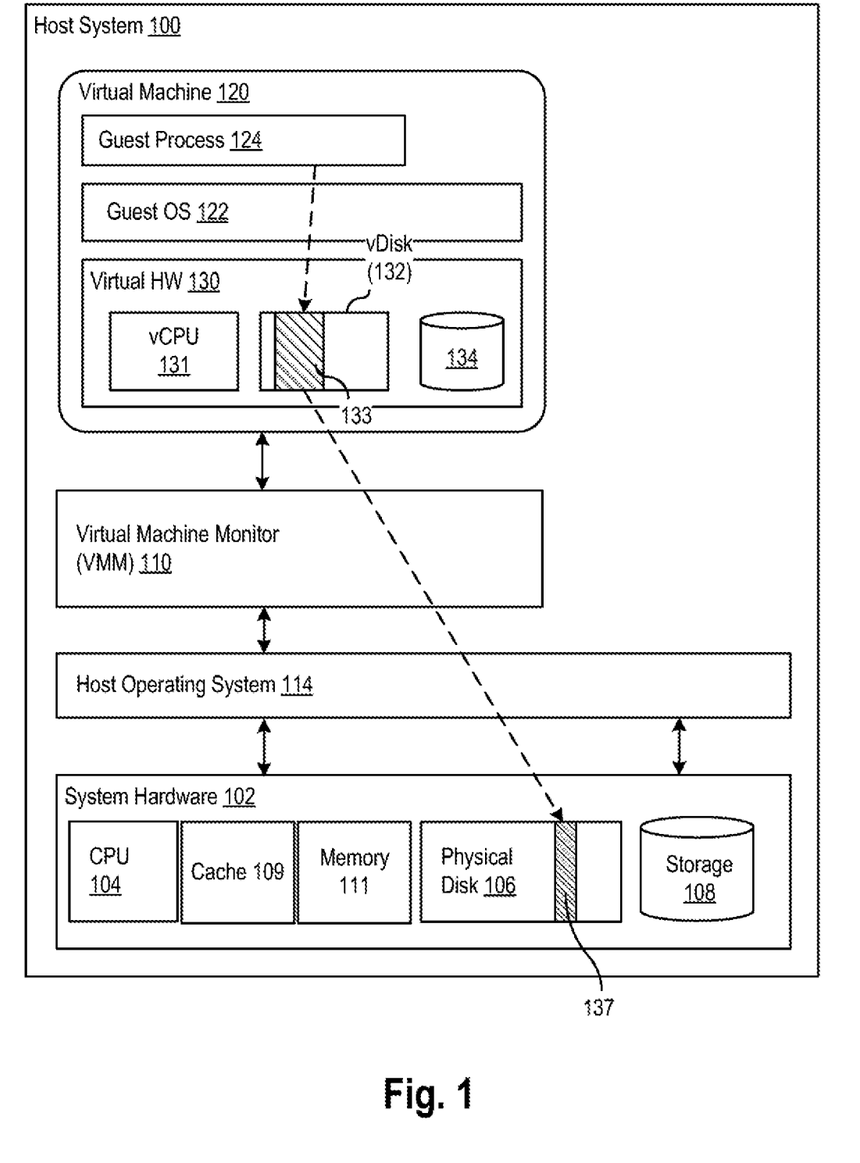
FIG. 1 is a block diagram illustrating a system for caching data in a virtual storage environment, according to an exemplary aspect of the disclosure.

FIG. 1 is a block diagram illustrating a system for caching data in a virtual storage environment, according to an exemplary aspect of the disclosure.

As shown, the host system 100 generally includes one or more virtual machines 120 that can be created on a host platform that includes system hardware 102, a host operating system 114, and a virtual machine monitor 110 (also known as a hypervisor or a "virtualizer"). The virtual machine monitor 110 (hereinafter referred to as "VMM 110") provides a guest operating system 122 of the virtual machine 120 with a virtual operating platform (depicted as virtual hardware 130) and manages execution of the guest OS 122. The VMM 110 may run directly on the underlying system hardware 102 or as an application or component running within a host operating system installed on the system hardware 102 (such a host OS is not shown in FIG. 1). Exemplary operations of a VMM 110 in various configurations are described in greater detail in U.S. Pat. No. 7,865,893 B1, "System and Method for Starting Virtual Machine Monitor in Common with Already Installed Operating System", which is incorporated herein by reference in its entirety.

The host system 100 may be any computing device, physical server, computer server, desktop, laptop, handheld device, tablet device, smartphone, or any other electronic device suitable for implementing virtualization as described herein. As shown, the system hardware 102 of a host can include at least one computer processing unit (CPU) 104, memory 111 (e.g., random access memory), storage devices 108 (e.g., hard disk drives) and cache 109. The host system 100 may include additional devices, software modules, and the like, as would be appreciated to one skilled in the art, but are not shown herein so as to not unnecessarily obscure the aspects of the disclosure. As software, the code for the VM 120 will typically execute on the actual system hardware 102.

In the exemplary aspect, the virtual machine 120 has both virtual system hardware 130 and guest system software, including the guest OS 122. The virtual system hardware 130 can include a virtual CPU 131, virtual memory 132, a virtual disk 134 (e.g., a particular case of a virtual storage device, and used interchangeably hereinafter), as well as other virtual hardware components, such as a virtual network interface. It is noted that all of the virtual hardware components of the virtual machine 120 can be implemented in software to emulate corresponding physical components, for example, using a virtual device emulator module. The guest OS 122 may be configured to support execution of one or more guest processes 124. A guest process 124 may be a running instance of program code that is part of a user-level application or guest application.

The VMM 110 acts as the interface between guest software executing within the VM 120, including one or more guest processes 124 and guest OS 122, and the hardware components and devices in the underlying system hardware platform 102 of the host machine. For example, to manage memory during operation of the VM 120, when a user-level guest process 124 requests a page of memory, the guest OS 122 allocates memory in an address space of the guest virtual memory 132. The address space of guest virtual memory 132 will be mapped to another memory address space of the host physical memory 111 of the system hardware 102. In this regard, the VMM 110 can maintain a paging structure, including one or more page tables or translation tables, such as the exemplary page mapping shown in U.S. Pat. No. 7,596,677, the entire contents of which are hereby incorporated by reference. If nested paging technology (e.g., Intel Extended Page Tables (EPT) or AMD Rapid Virtualization Indexing (RVI)) is available on the CPU, the VMM 110 can manage EPT page tables to control guest physical address to host mappings.

The guest virtual memory 132 of the virtual machine 120 is backed by the corresponding host physical memory 111 in system hardware 102. For clarity of discussion, the term "guest physical memory" or "guest OS memory" refers to emulated memory (e.g., virtual memory 132) that is visible to the guest OS 122. The term "guest virtual memory" refers to a virtual address space 133 exposed to guest applications or guest processes 124 and provided by the guest OS 122 as a memory management technique that uses disk storage to extend physical memory. "Host virtual memory" refers to a continuous virtual address space that the host itself may expose to the VMM 110, host OS processes (such as host-side process 112), and/or host operating system 114 of the host using virtual memory techniques. The term "host physical memory" refers to hardware memory or machine memory (e.g., memory 111) that is visible from the perspective of the VMM 110.

As part of its execution, a guest process 124 may execute one or more system calls. By invoking a system call, the guest process 124 requests a (typically, privileged) service from the kernel of an underlying operating system (in the case of a guest process 124, the guest operating system 122). For example, the guest process 124 may invoke a system call to request services related to file management, such as system calls for creating, deleting, opening, closing, reading, and writing files within virtual disk 134. In another example, the guest process 124 may invoke one or more system call related to memory management, such as calls for allocating or freeing memory from virtual memory 132. In another example, the guest process 124 may invoke one or more system calls to request services from the guest kernel related to the process control and management, such as system calls for creating, starting, and stopping (guest) processes, and loading libraries; as well as system calls related to network management (e.g., sending and receiving messages).

In one aspect, virtual machines have a guest OS, a hypervisor that monitors and intercepts access to physical hardware and the VMM 110, residing in the host OS. The VMM 110 receives requests to access the disk from the guest OS. The VMM 110 translates request to access a disk from the guest OS to the host OS. This may include obtaining the sector number on the guest OS physical disk, determining which file to use (if there are many disks or disk is split by chunks), calculating from a virtual disk metadata position in the file and changing the host OS read/write operation to this calculated position.

Typically, the virtual machine disk 134 is designed as a set of virtual blocks which map to physical blocks on the disk image file 137, corresponding to the virtual machine disk 134, stored on the physical disk 106. The virtual blocks are generally stored non-sequentially in the image file. For example, when the guest OS 122 writes to a first sector of the virtual disk, the VMM 110 creates a first block and when the next write occurs to the virtual disk 134, the VMM 110 creates a second block which is stored after the first block in a disk image file 137 corresponding to the virtual disk 134, oftentimes in an unordered fashion. Most modern operating systems allow multitasking by, in some aspects, interleaving calls to store data on a disk or writing data to disk simultaneously. Writing of a particular file may be interrupted by writing a block to another file. Therefore the physical blocks become interleaved with physical blocks of another file. In some scenarios, files are extended after a long period of disuses. In this scenario, the physical block associated with the extension of the file will be located in another location of the virtual disk. Accordingly, blocks of a particular file or of related files may be stored in different locations in the disk image file 137.

Figure 2A:
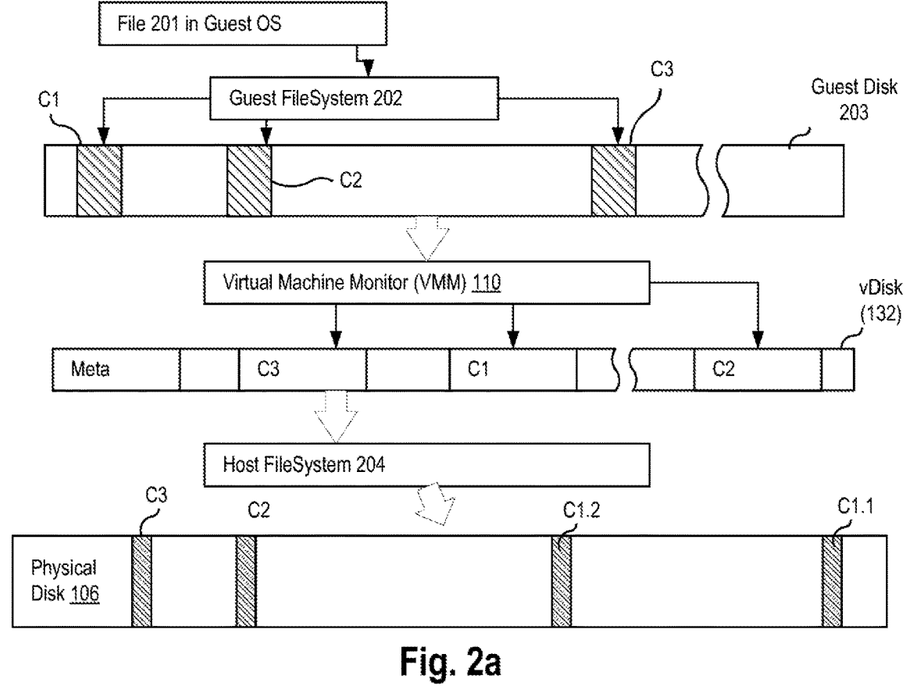
FIG. 2a is a block diagram illustrating how a virtual file is stored in the physical disk, according to an exemplary aspect of the disclosure.

Further details of how a virtual file is ultimately stored in a physical disk are illustrated in FIG. 2*a*. For example, file 201 is created in the guest filesystem 202 of the guest OS 122. The guest filesystem 202 may store each chunk (e.g. chunks C1, C2 and C3) non-linearly in various portions of the guest disk 203. In one aspect, the VMM 110 may map chunks of the file 201, e.g., C1, C2 and C3, in a different order on virtual disk 134 than stored on the guest disk 203. For example, according to FIG. 2*a*, C3 is stored earlier on virtual disk 134 than C1 and C2. Finally, the host OS file system 204 may, in one aspect, divide a virtual disk file representing the virtual disk 134 into several chunks on the physical disk 106. In the illustrated example, C3, C2, C1.1 and C1.2 (which is a further chunk of C1 divided by the host OS) are stored in different locations entirely, shuffling the chunks once again. C1.2 is shown because blocks in a virtual disk file are generally larger than filesystem blocks, and therefore a virtual disk block such as C1 may be divided by the host filesystem to sub-blocks, such as C1.1 and C1.2. Chunks C1.1 and C1.2 are often stored in non-linear order on the disk 106.

Because of the above reordering, reshuffling and division of chunks that occurs, when the guest OS 122 performs a read operation on blocks belonging to the same file or related files stored in the virtual disk 134 that are often read together, the VMM 110 may cause the physical disk 106 to skip from a beginning of the disk image file 137, to the end of the disk image file 137, and back to the middle of the disk image file 137 because the virtual blocks of the files may not be mapped in order on the disk image file 137. This significantly increases read times and degrades the physical disk 106 due to excessive mechanical movement (e.g., rotation of the platter of the physical disk).

According to aspects of the present disclosure such difficulties are avoided because the VMM 110 generates one or more operational graph data structures which identify blocks of the physical disk 106 that are related by, for example, operation that the VMM performs thereon. In one aspect, the graph data structure identifies blocks of the virtual disk 134, operations performed on the blocks, and vectors identifying transitions from one operation performed on one block to another operation performed on another block. In one aspect, the data structure also indicates a count of the transitions of operations between two blocks. According to one aspect, a plurality of graphs are created, each graph only identifying those blocks upon which one operation is performed. For example, there may be one graph identifying all bocks having read operations performed thereon, another graph identifying all blocks having write operations performed thereon, and a third graph identifying all blocks having both read and write operations performed thereon. In one aspect, the graph nodes store operations count and arch length (alternatively referred to as arc weight) is a transition count, implemented in some aspects as hidden Markov chains. According to some aspects, the operation count may be used in calculating the weight of an arc. For example, if a node has five arcs with 10, 20, 20, 45 and 5 transitions to other nodes, the operations count is calculated as 100. The arc weights are then 0.1, 0.2, 0.2, 0.45 and 0.05, respectively, after being normalized.

Subsequently, the VMM 110 clusters each of these graphs by performing a graph cut algorithm on the graphs in order to segment each graph into smaller portions or chunks of blocks, where nodes in the graph represent blocks. According to some aspects, the graph cut algorithm is performed until each of the segments has a number of nodes equal or less than a predetermined threshold number. In another aspect of the disclosure, the segmentation (e.g., using the graph cut algorithm) is performed by the VMM 110 until a sum of the removed arc weights is equal to or larger than a predetermined threshold number. In one aspect, the threshold number is preset by an administrator of the system in a storage policy, or may be modified based on machine learning. After the segmentation, well-separated chunks of blocks, or clusters, are obtained, where the clusters are related to each other in that the blocks in the clusters are mostly read from together, or mostly written to together, or read to and written from together. Additionally, the clusters indicate patterns of operations over the blocks, i.e., read mostly, read/write mostly, or the like. In this aspect, the VMM 110 may defragment the virtual disk file to store/relocate blocks in the same cluster in the properly sorted order. Further, the VMM 110 may advise the host OS cache to next read blocks found in the same cluster as a previously read/written block.

The VMM 110 applies a cache policy to each of the clustered groups of blocks based on analysis of the operational graphs for caching portions of the disk image file 137 into cache 109 to improve the reading and writing of the virtual blocks by the guest OS 122.

In exemplary aspects of the present disclosure, a cache policy dictates which blocks of the physical disk 106 are placed into cache, so that the VMM 110 can easily retrieve blocks that are related in the virtual disk 134, but disordered on the physical disk 106. For example, those blocks of the physical disk 106 that are often read together, or written to together, or read/write operations are performed together on the virtual disk device, may be placed in cache at the same time to prevent excessive access on the physical disk 106, thus preventing mechanical motion that could lead to reduction in life of a physical disk 106, or entire disk failure of the physical disk 106.

In one aspect, the cache policy is applied by the VMM 110 by calling specialized functions which advises an operating system to read ahead an entire cluster of blocks based on the cache policy, instead of block by block. In UNIX-based operating systems, the "fcntl" function may be used to advise an OS about which blocks to cache, while in OS X the "F_RDAHEAD, F_RADVISE and FNOCACHE" may be used. In WINDOWS based operating systems turning cache off may be used. In some aspects, read-ahead can be simulated by reading data to memory, without using that data later, from blocks of a virtual disk file which are cached in memory in the host OS.

According to one aspect, caching policies for a host OS may comprise: no caching, no read caching (i.e., when overwriting a whole file block, the OS advises to not read the block before in case the contents are not needed), and read-ahead caching.

Figure 2B:
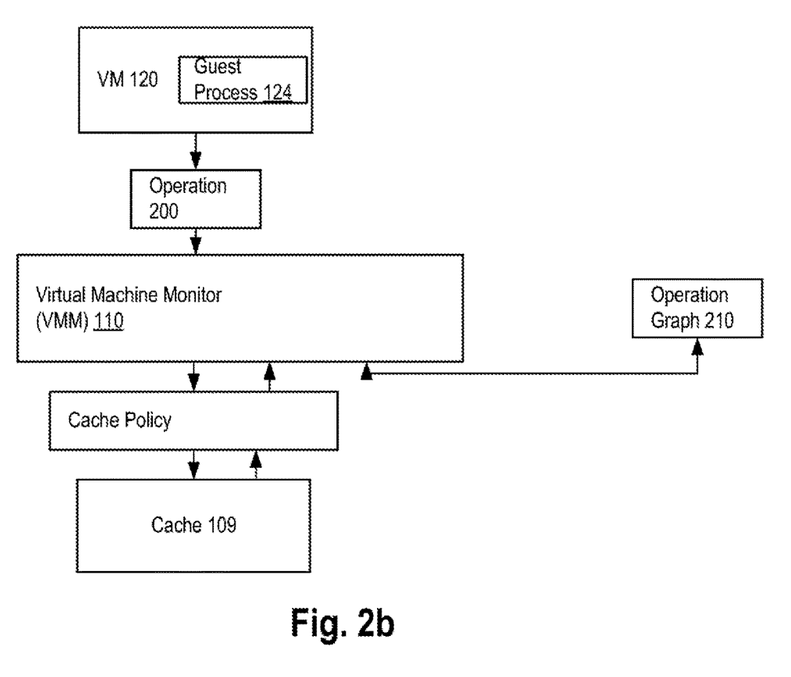
FIG. 2b is a block diagram illustrating monitoring of operations in the virtual machine, according to an exemplary aspect of the disclosure.

FIG. 2b is a block diagram illustrating monitoring of operations in the virtual machine, according to an exemplary aspect of the disclosure. The VMM 110 monitors an operation such as operation 200 executed by guest process 124 on virtual machine 120. The operation 200 may be a read operation or a write operation for reading a block of the virtual machine disk 134. Based on a plurality of such the read/write operations, the VMM 110 generates one or more operational graphs 210. The operational graphs 210 comprise one or more graphs that identify transitions from one block to the next. In one aspect, the operational graphs 210 are implemented similarly to hidden Markov chains.

Figure 3:
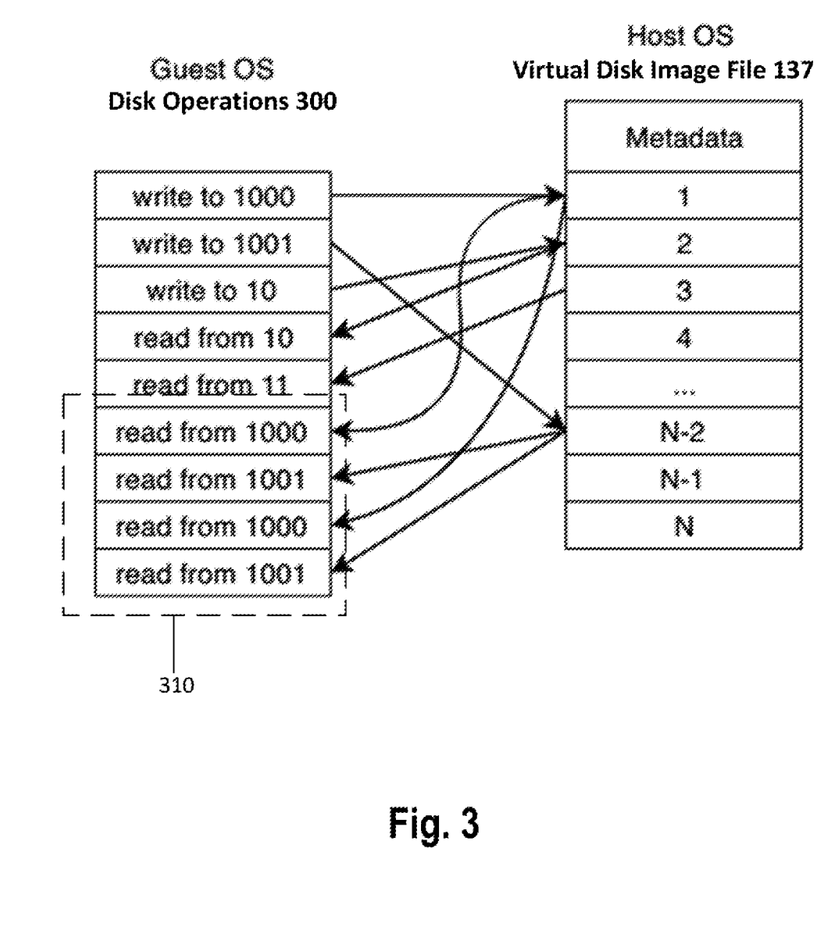
FIG. 3 is a diagram illustrating the operations in a virtual storage environment, according to an exemplary aspect of the disclosure.

As shown in FIG. 3, the VMM 110 records disk operations 300 performed by the Guest OS. The disk operations 300 reference various portions of the virtual disk image file (alternatively referred to as disk image file or simply image file) 137 stored on the physical disk of the host OS. According to the illustrated set of exemplary operations shown in FIG. 3, the Guest OS may perform a write operation to virtual block 1000 and subsequently perform a write to virtual block 1001. However the virtual block 1000 may map to physical block 1, while the virtual block 1001 may map to physical block N−2, where N is the total number of blocks in the virtual disk image file 137. Continuing with the disk operations 300, the Guest OS may write to virtual block 10, corresponding to block 2 of the image file 137, and read from virtual block 10, read from virtual block 11, corresponding to block 3 of the image file 137. Next, the Guest OS may read from virtual block 1000, which causes the underlying physical disk to rotate back into position to read from block 1 of the image file 137. Subsequent operations 300 include reading from virtual block 1001, reading from virtual block 1000 and reading again from virtual block 1001. These operations typify a sequence of operations performed by a guest OS, and are meant as examples only. The present disclosure does not limit the type or order of operations that are monitored by the VMM 110.

As can be appreciated from FIG. 3, the operations performed on the physical disk 106 sequentially include: writing to block 1; writing to block N−2; writing to block 2; reading from block 2; reading from block 3; skipping back to read from block 1; then skipping forward to read from block N−2; then skipping back to read from block 1; and finally skipping forward once more to read from block N−2 of the image file 137. Thus, in regular operations of a guest OS, the underlying physical disk 106 may access many different non-contiguous blocks, leading to slower access times by the virtual machine, slowing down the guest OS. It can be further appreciated that generally, the guest OS will read from a limited set of areas (e.g., system files and applications) and write to other areas (e.g., log files), while read/write operations are generally performed on ordinary user data and, for example, a page file associated with the virtual disk 134.

Figure 4:
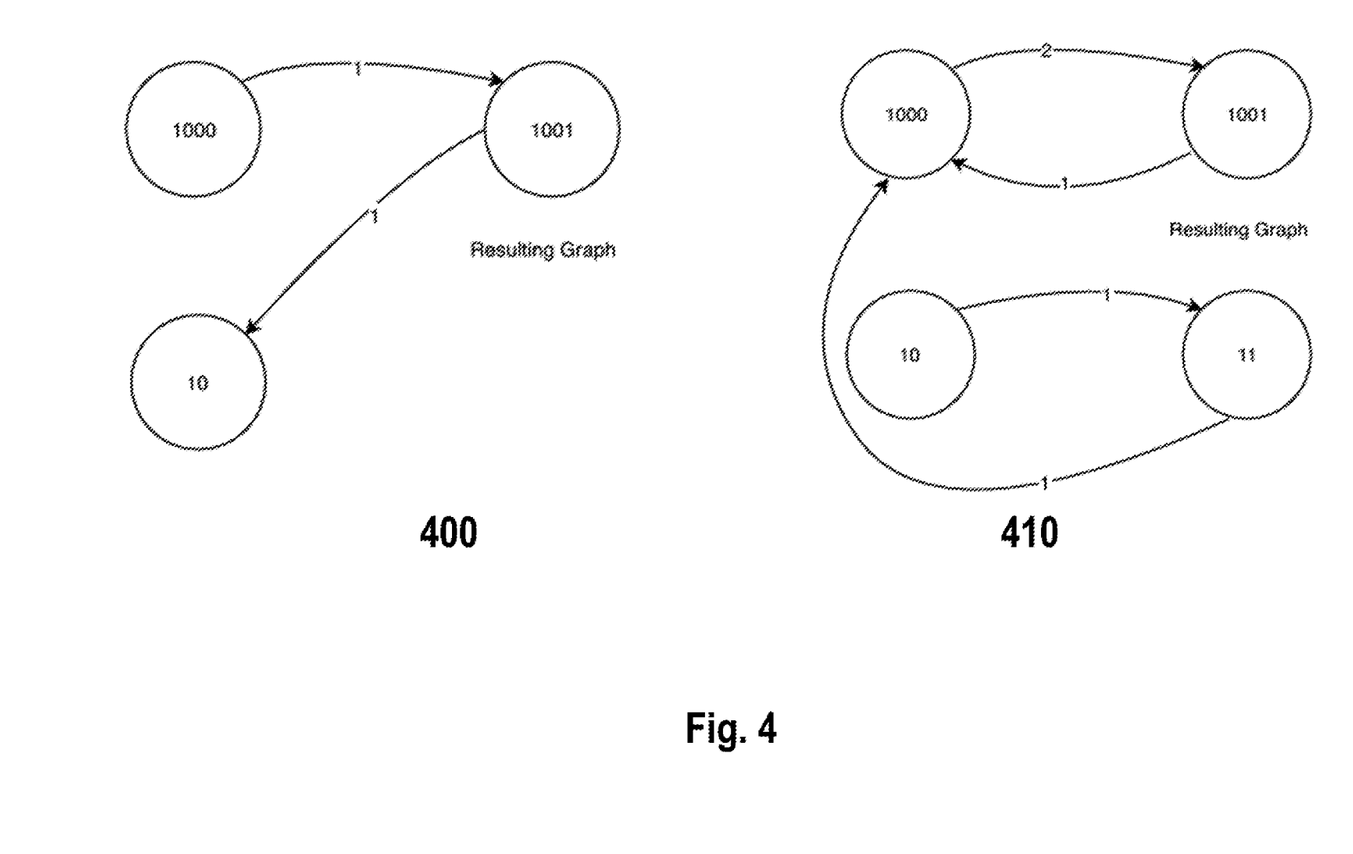
FIG. 4 is a diagram illustrating graphs of the operations in a virtual storage environment, according to an exemplary aspect of the disclosure.

Based on the examples shown in FIG. 3, the VMM 110 generates one or more operational graphs as illustrated in FIG. 4. FIG. 4 illustrates a write operational graph 400 and a read operational graph 410. The graphs 400 and 410 illustrates the transitions between virtual blocks, where the virtual blocks are nodes, and the number of transitions are represented as arc lengths between the nodes. As observed in the list of operations 300 performed by the guest OS, a single write is performed to virtual block 1000, followed by a transition to a write operation to virtual block 1000, after which a write to virtual block 10 is performed. The read operational graph 410 contains transitions between nodes 10 to 11, 11 to 1000, 1000 to 1001 and from 1000 back to 1001. Thus the arc length for the transition between read operations from virtual block 1000 to read operation from virtual block 1001 is "2", as is observed in portion 310 of disk operations 300. It can be concluded, then, that virtual blocks 1000 and 1001 are related and may be accessed at similar times.

It is noted that while operation graphs 400 and 410 are shown as distinct graphs, the graphs may, according to one aspect, be physically stored as one data structure (or, alternatively, stored as multiple data structures), depending on operational considerations of the system 100. In some instances, a single data structure may consume less memory, but operations performed thereon may be slower. Multiple data structures consume more memory, but operations can be performed quickly thereon. Storing the graphs in one data structure or multiple data structures is dependent on memory size and speed requirements and may be predetermined.

In general, an operational graph generated by the VMM 110 describes disk operations performed on the entire virtual disk 134. In order to determine strongly related blocks, according to some aspects of the disclosure, the graph is cut into smaller graphs describing chunks of disk blocks. In some aspects, a minimal k-cut algorithm is used to segment the graph into smaller graphs, though other algorithms may be used. According to one aspect, blocks that are strongly related are those blocks that are mostly read together or alternatively, those blocks that are mostly written together, such as blocks 1000 and 1001 in FIG. 3 and FIG. 4. In another aspect, blocks are strongly related when the blocks are mostly read and written together.

Figure 5:
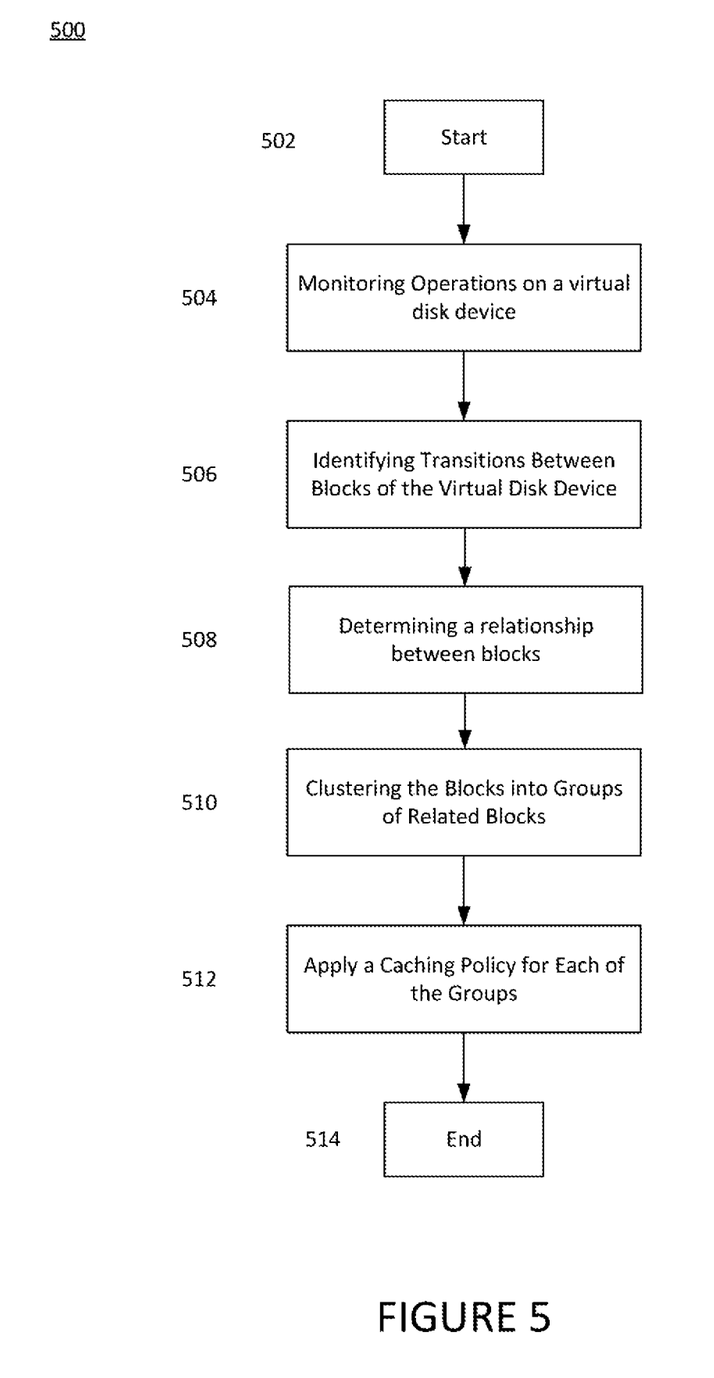
FIG. 5 is a flowchart illustrating a method for caching data in a virtual storage environment, according to an exemplary aspect of the disclosure.

FIG. 5 is a flowchart illustrating a method for caching data in a virtual storage environment, according to an exemplary aspect of the disclosure.

The method begins at step 502 and proceeds to step 504. At step 504, the VMM 110 monitors operations performed on blocks of a virtual storage device. These operations may include reading to a block or writing from a block. During normal operation of a guest OS, the guest OS generally reads from one area of the virtual disk devices, e.g., the system files and applications and mostly writes to other areas such as where log files are stored. The Guest OS normally performs read/write operations where user data is stored and in the page file. As the guest OS performs each operation on the blocks of the virtual disk device, the VMM 110 monitors and records each of the operations as the operations are mapped to reading and writing to the physical disk 106.

At step 506, the VMM 110 identifies transitions between blocks of the virtual device. In one aspect, a transition refers to when the guest OS performs a write operation to block 1000 of the virtual disk, and then transitions to performing a write operation to block 1001, as illustrated in FIG. 3 and FIG. 4. Thus, there is a transition of operation from the Guest OS writing to block 1000 to writing to block 1001. The VMM 110 keeps track of similar transitions and each time a transition from block 1000 to block 1001 is identified again, the "count" associated with this particular transition from block 1000 to block 1001 is increased.

The method 500 proceeds to step 508, where the VMM 110 determines relationships between blocks identified in the identified transitions in step 506. In some aspects of the disclosure, the relationship defines whether blocks have similar operations performed thereon. For example all blocks that the guest OS has written to are defined as related and all blocks that the guest OS has read from are also determined to be related. In some aspects, those blocks that are read and written to are determined to be related.

Blocks that are determined to be related are then clustered into groups at step 510 based on the relationships. In one aspect, blocks that are read from are grouped in a first group, while blocks that are written to are grouped in a second group, and blocks that are read and written to are grouped in a third group. According to one aspect, the clustering may comprise building a graph of monitored operations where nodes of the graph comprise blocks and arc lengths of the graph indicate transition count. In this aspect, the graph is a data structure stored in memory and populated by the VMM 110 as operations are performed by the guest OS.

According to this aspect, the clustering operation may be performed over several iterations by performing a graph cut algorithm on the graph data structure to segment the graph into smaller graphs. In one aspect, a minimal K-cut algorithm is performed to cluster the graph into portions. Subsequent to dividing the graph data structure, the VMM 110 determines whether the cut has left each segment of the graph with a number of nodes lower than a predetermined threshold level, or in some embodiments if the arc weights are equal to or above a particular threshold value. At the beginning of the segmentation algorithm, there is one large graph data structure, and two empty lists that are created: 1) the result list, and 2) the processing list, where the one graph is initially copied. At step (i), the processing list is retrieved (containing the graph). If there is no graph, then the algorithm ends. However, if there is a graph to be retrieved, at step (ii) the VMM 110 determines whether the graph conforms to a set of criteria. In one aspect, the criteria is whether the node count is larger than a threshold value and if the node count is less than the threshold, the graph is removed and the algorithm returns to step (i)—retrieving the graph(s) stored in the processing list.

If the graph conforms to the criteria, at step (iii), a minimal cut price is calculated. In one aspect, the minimal cut price may include counting arc lengths in the graph which should be removed after a "cut" of the graph. If the price of the minimal cut is larger than a threshold, the graph is moved to the results list without being cut because the graph contains many operations from node to node.

If, at step (iv), the price of the minimal cut is equal to or less than the threshold value, the minimal cut is executed and the graph is segmented, or cut according a preferred cut leaving two or more graphs. The two or more graphs are moved back to the processing list, and the algorithm returns to step (i)—retrieving the graph(s) from the processing list.

In some aspects of the disclosure, graph processing is performed a number of times, depending on read/write operations count. For example, if it is assumed that there are ten million read/write operations, then this is approximately 45 million operations daily for a high activity system. An average activity system may have significantly less than that, and thus graph cuts may be performed one or two times in a week, variable according to the system and its needs.

According to one aspect of the disclosure, the predetermined threshold amount of nodes is based on experimentation and may be altered to tune for local hardware considerations, in some aspects based on a determined median arc length and strongly connected groups of nodes which are found. In some aspects, this includes collecting data and count statistics of common values for arc length and basing threshold on the common values. In some instances, this takes the form of counting arc values and checking the statistical distribution, which can be normal or chi-squared. After such statistics gathering, arcs with less than "median arc value+2 standard deviations", or "median arc value+ standard deviation" can be removed. This may improve the speed of performing a graph cut.

The method proceeds to 512 where caching policy from a group of predefined caching policies is applied to each of the groups of related blocks. In some aspects, each group/cluster may be assigned a different caching policy, though some clusters may be assigned the same caching policy. In some aspects, if the host OS does not allow different cache policies, read-ahead may be simulated as described above.

The method terminates at 514.

Figure 6:
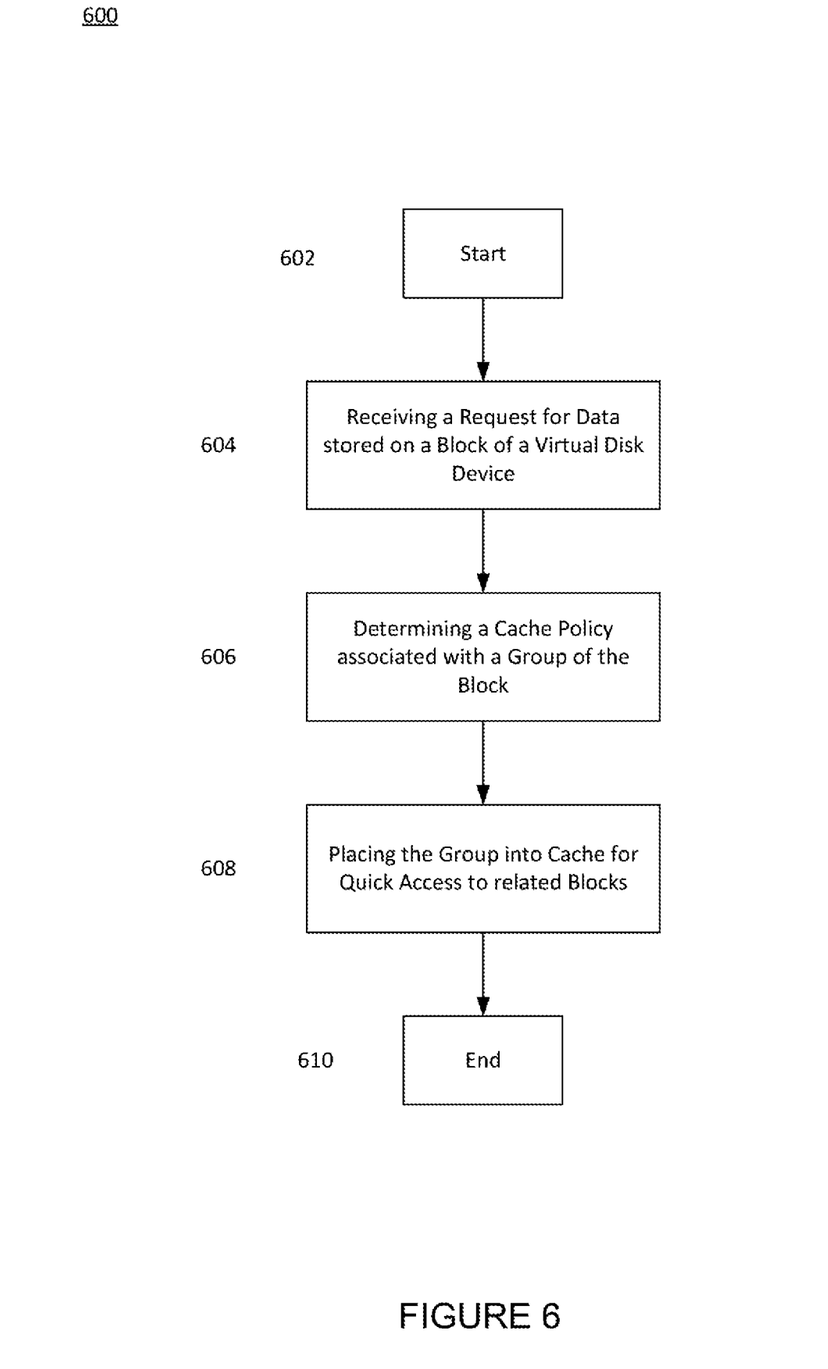
FIG. 6 is a flowchart illustrating a method for caching a group of blocks in a virtualized storage environment, according to an exemplary aspect of the disclosure.

FIG. 6 is a flowchart illustrating another method for adjusting cache policy in a virtualized environment, according to an exemplary aspect of the disclosure.

The method begins at 602 and proceeds to 604. At 604, the VMM receives a request for data on a block of a virtual storage device from a guest OS. At 606, the VMM searches a table, for example, to determine if a cache policy is associated with a group that the block belongs to.

According to the cache policy, the VMM 110 requests that the guest OS place all blocks in the group into cache of the device running the guest OS at 608, so that future requests for the block can be quickly executed.

The method terminates at step 610.

Figure 7:
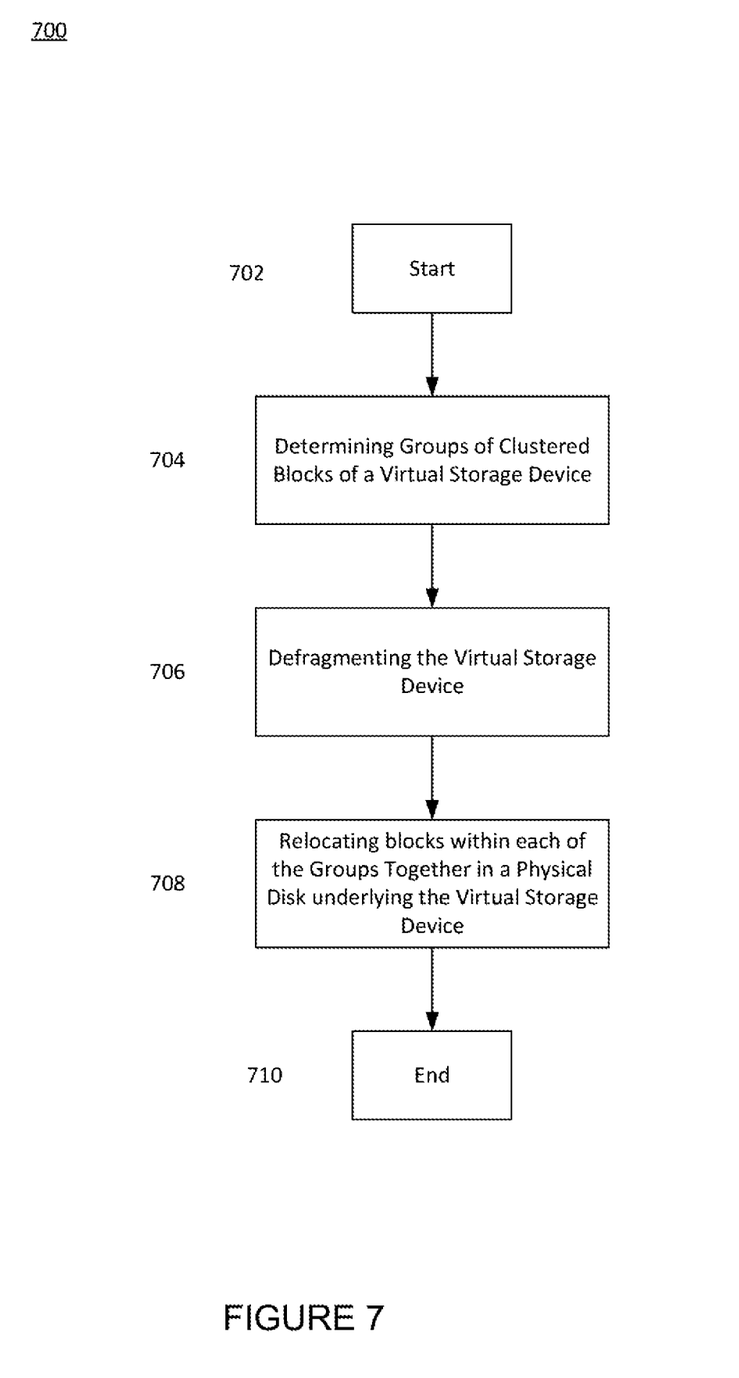
FIG. 7 is a flowchart illustrating a method for defragmenting a virtual storage device, according to an exemplary aspect of the disclosure.

FIG. 7 is a flowchart illustrating yet another method 700 for adjusting cache policy in a virtualized environment, according to an exemplary aspect of the disclosure.

The method 700 begins at 702 and proceeds to 704.

At 704, groups of clustered blocks in a virtual storage device (e.g., those blocks that are related to each other in some way, either operations or the like).

At 706, defragmentation is performed on the virtual storage device.

Subsequently, at 708 the VMM 110 relocates blocks within each of the groups together in the actual virtual image file on the physical disk underlying the virtual storage device. Accordingly, the virtual image file is "defragmented" by collocating related blocks and forming a linear structure on the virtual disk file, limiting disk operations that may damage or cause excessive wear on the physical disk.

The method terminates at 710.

In general, the term "module" as used herein can refer to a software service or application executed as part of the guest operating system 122 or the VMM 110. However, in general, the term module can be considered to be executed on one or more computers, including real-world devices, components, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module can also be implemented as a combination of the two, with certain functions facilitated by hardware alone, and other functions facilitated by a combination of hardware and software. In certain implementations, at least a portion, and in some cases, all, of a module can be executed on the processor of a general purpose computer. Accordingly, each module can be realized in a variety of suitable configurations, and should not be limited to any example implementation described herein.

Moreover, in general, it should be appreciated that the disclosed system and methods are described herein in the context of a hosted virtualized computing system. However, in alternative aspects, the system and method may be implemented for a non-hosted virtualized computer system, and may also be implemented directly in a computer's primary OS, both where the OS is designed to support virtual machines and where the OS does not support virtual machines.

Figure 8:
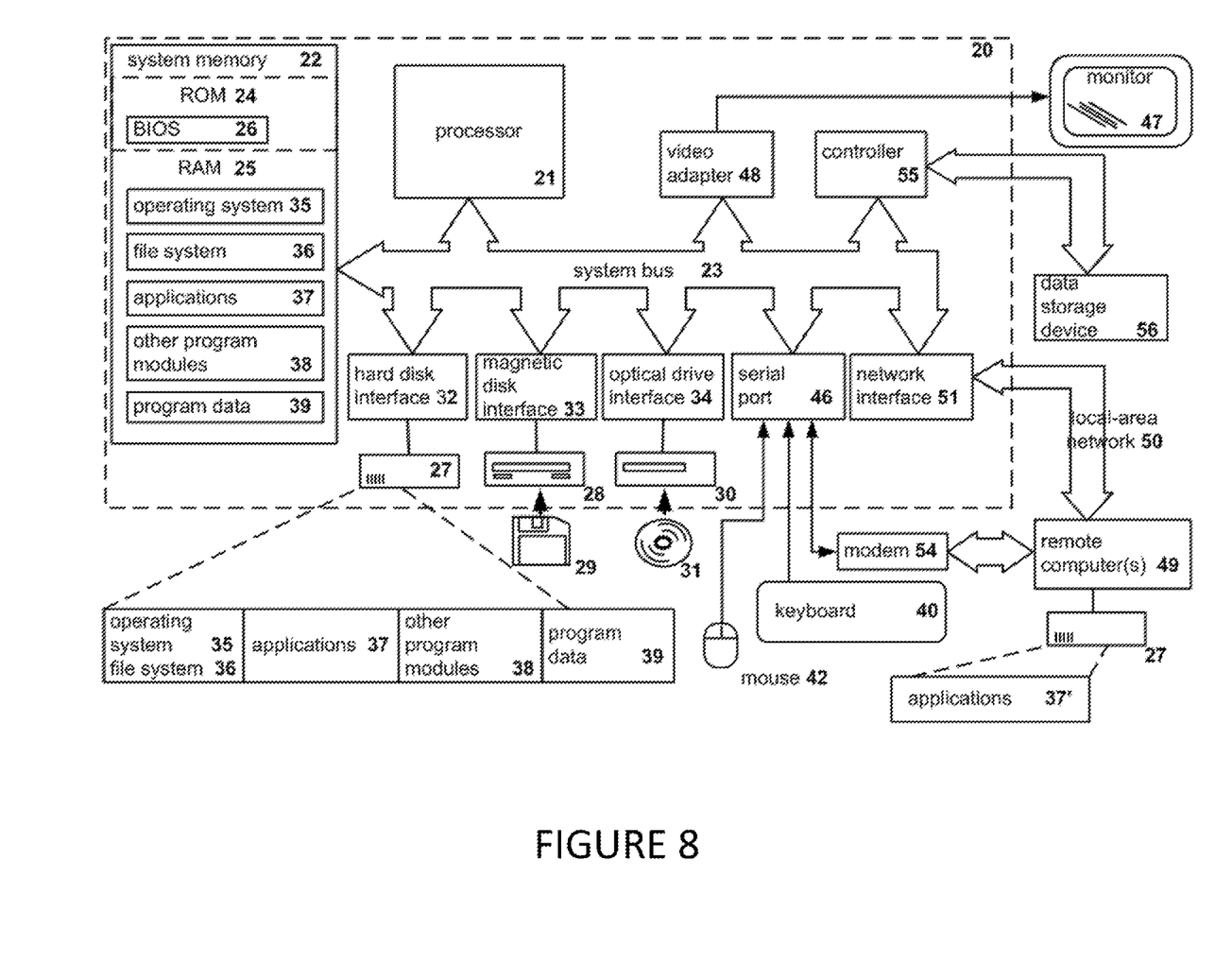
FIG. 8 is a block diagram of a general-purpose computer system on which the disclosed system and method can be implemented according to an exemplary aspect of the disclosure.

FIG. 8 is a block diagram illustrating a general-purpose computer system 20 on which aspects of systems and methods for tuning cache policies in a virtualized environment may be implemented in accordance with an exemplary aspect. It should be noted that the computer system 20 can correspond to the system 100 or any components therein.

As shown, the computer system 20 (which may be a personal computer or a server) includes a central processing unit 21, a system memory 22, and a system bus 23 connecting the various system components, including the memory associated with the central processing unit 21. As will be appreciated by those of ordinary skill in the art, the system bus 23 may comprise a bus memory or bus memory controller, a peripheral bus, and a local bus that is able to interact with any other bus architecture. The system memory may include permanent memory (ROM) 24 and random-access memory (RAM) 25. The basic input/output system (BIOS) 26 may store the basic procedures for transfer of information between elements of the computer system 20, such as those at the time of loading the operating system with the use of the ROM 24.

The computer system 20, may also comprise a hard disk 27 for reading and writing data, a magnetic disk drive 28 for reading and writing on removable magnetic disks 29, and an optical drive 30 for reading and writing removable optical disks 31, such as CD-ROM, DVD-ROM and other optical media. The hard disk 27, the magnetic disk drive 28, and the optical drive 30 are connected to the system bus 23 across the hard disk interface 32, the magnetic disk interface 33 and the optical drive interface 34, respectively. The drives and the corresponding computer information media are power-independent modules for storage of computer instructions, data structures, program modules and other data of the computer system 20.

An exemplary aspect comprises a system that uses a hard disk 27, a removable magnetic disk 29 and a removable optical disk 31 connected to the system bus 23 via the controller 55. It will be understood by those of ordinary skill in the art that any type of media 56 that is able to store data in a form readable by a computer (solid state drives, flash memory cards, digital disks, random-access memory (RAM) and so on) may also be utilized.

The computer system 20 has a file system 36, in which the operating system 35, may be stored, as well as additional program applications 37, other program modules 38, and program data 39. A user of the computer system 20 may enter commands and information using keyboard 40, mouse 42, or any other input device known to those of ordinary skill in the art, such as, but not limited to, a microphone, joystick, game controller, scanner, etc. Such input devices typically plug into the computer system 20 through a serial port 46, which in turn is connected to the system bus, but those of ordinary skill in the art will appreciate that input devices may be also be connected in other ways, such as, without limitation, via a parallel port, a game port, or a universal serial bus (USB). A monitor 47 or other type of display device may also be connected to the system bus 23 across an interface, such as a video adapter 48. In addition to the monitor 47, the personal computer may be equipped with other peripheral output devices (not shown), such as loudspeakers, a printer, etc.

Computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes.

Network connections can form a local-area computer network (LAN) 50 and a wide-area computer network (WAN). Such networks are used in corporate computer networks and internal company networks, and they generally have access to the Internet. In LAN or WAN networks, the personal computer 20 is connected to the local-area network 50 across a network adapter or network interface 51. When networks are used, the computer system 20 may employ a modem 54 or other modules well known to those of ordinary skill in the art that enable communications with a wide-area computer network such as the Internet. The modem 54, which may be an internal or external device, may be connected to the system bus 23 by a serial port 46. It will be appreciated by those of ordinary skill in the art that said network connections are non-limiting examples of numerous well-understood ways of establishing a connection by one computer to another using communication modules.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In various aspects, the systems and methods described in the present disclosure can be addressed in terms of modules. The term "module" as used herein refers to a real-world device, component, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a general purpose computer (such as the one described in greater detail in FIG. 7, above). Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

What is claimed is:

1. A method for caching data in a virtual storage environment, comprising:

monitoring, by a hardware processor, operations on a virtual storage device;

identifying, by the hardware processor, transitions between blocks of the virtual storage device that have the operations performed thereon;

determining, by the hardware processor, a relationship between each of the blocks based on the identified transitions;

clustering the blocks into groups of related blocks based on the relationship; and applying, by the hardware processor, one of a plurality of different caching policies to blocks in each of the groups based on the clustering.

2. The method of claim 1, further comprising:

receiving a request for data stored on a block of the virtual storage device;

determining a group in which the block has been clustered;

determining a cache policy associated with the group; and placing the group into cache for future access to each of the blocks within the group based on the cache policy.

3. The method of claim 1, further comprising:

determining the groups of the clustered blocks of the virtual storage device;

defragmenting the virtual storage device; and relocating blocks within each of the groups together in a physical disk underlying the virtual storage device.

4. The method of claim 1, wherein the relationship indicates blocks having the same operations performed thereon.

5. The method of claim 4, wherein the operations comprise at least one of a read operation, or a write operation to a block on the virtual storage device.

6. The method of claim 5, wherein identifying the transitions further comprises:

counting the operations on blocks and transitions from one block to another.

7. The method of claim 6, wherein clustering the blocks further comprises:

building a graph of the operations where nodes of the graph comprise blocks, and arc lengths of the graph indicate transition count between the blocks.

8. The method of claim 7, further comprising:

performing a graph cut algorithm on the graph of the operations;

determining whether a cut according to the graph cut algorithm conforms to a set of criteria, the set of criteria comprising one of: leaves all segments of the graph having a number of nodes lower than a predetermined threshold value, or whether the total arc weights for the graph is greater than or equal to a predetermined threshold value;

dividing the graph over the cut when the cut conforms;

grouping those segments that conform to the set of criteria into a results list; and re-performing the graph cut algorithm on those segments in the results list.

9. The method of claim 8, wherein the graph cut algorithm is a minimal cut algorithm.

10. The method of claim 8, wherein the predetermined threshold value is determined after a set of experiments and wherein the method further comprises:

determining arcs with length less than a median arc value plus two standard deviations; and removing the determined arcs from the graph.

11. The method of claim 1, wherein the transitions are changes from operating on one block in the virtual storage device to operating on another block in the virtual storage device.

12. A system for caching data in a virtual storage environment, comprising:
a hardware processor configured to:
monitor operations on a virtual storage device;
identify transitions between blocks of the virtual storage device that have the operations performed thereon;
determine a relationship between each of the blocks based on the identified transitions;
cluster the blocks into groups of related blocks based on the relationship; and
apply one of a plurality of different caching policies to blocks in each of the groups based on clustering.

13. The system of claim 12, wherein the hardware processor is further configured to:
receive a request for data stored on a block of the virtual storage device;
determine a group in which the block has been clustered;
determine a cache policy associated with the group; and
place the group into cache for future access to each of the blocks within the group based on the cache policy.

14. The system of claim 12, wherein the hardware processor is further configured to:
determine the groups of the clustered blocks of the virtual storage device;
defragment the virtual storage device; and
relocate blocks within each of the groups together in a physical disk underlying the virtual storage device.

15. The system of claim 12, wherein the relationship indicates blocks having the same operations performed thereon.

16. The system of claim 15, wherein the operations comprise at least one of a read operation, or a write operation to a block on the virtual storage device.

17. The system of claim 16, wherein identifying the transitions further comprises:
counting the operations on blocks and transitions from one block to another.

18. The system of claim 17, wherein clustering the blocks further comprises:
building a graph of the operations where nodes of the graph comprise blocks, and arc lengths of the graph indicate transition counts between the blocks.

19. The system of claim 18, wherein the hardware processor is further configured to:
performing a graph cut algorithm on the graph of the operations;
determining whether a cut conforms to a set of criteria, the set of criteria comprising one of: according to the graph cut algorithm leaves all segments of the graph having a number of nodes lower than a predetermined threshold value, or whether the total arc weights for the graph is greater than or equal to a predetermined threshold value;
dividing the graph over the cut when the cut conforms;
grouping those segments that conform to the set of criteria into a results list; and
re-performing the graph cut algorithm on those segments in the results list.

20. A non-transitory computer-readable medium storing instructions thereon for caching data in a virtual storage environment, the instructions comprising:
monitoring operations on a virtual storage device;
identifying transitions between blocks of the virtual storage device that have the operations performed thereon;
determining a relationship between each of the blocks based on the identified transitions;
clustering the blocks into groups of related blocks based on the relationship; and
applying one of a plurality of different caching policies to blocks in each of the groups based on the clustering.

21. The medium of claim 20, the instructions further comprising:
receiving a request for data stored on a block of the virtual storage device;
determining a group in which the block has been clustered;
determining a cache policy associated with the group; and
placing the group into cache for future access to each of the blocks within the group based on the cache policy.

22. The medium of claim 20, the instructions further comprising:
determining the groups of the clustered blocks of the virtual storage device;
defragmenting the virtual storage device; and
relocating blocks within each of the groups together in a physical disk underlying the virtual storage device.

* * * * *